US012578461B2

(12) United States Patent
Patel

(10) Patent No.: US 12,578,461 B2
(45) Date of Patent: Mar. 17, 2026

(54) ADJUSTABLE SENSOR HOUSING

(71) Applicant: GM Cruise Holdings LLC, San Francisco, CA (US)

(72) Inventor: Anurag Patel, San Jose, CA (US)

(73) Assignee: GM Cruise Hodings LLC, San Francisco, CA (US)

( * ) Notice: Subject to any disclaimer, the term of this patent is extended or adjusted under 35 U.S.C. 154(b) by 296 days.

(21) Appl. No.: 17/986,533

(22) Filed: Nov. 14, 2022

(65) Prior Publication Data

US 2024/0159891 A1 May 16, 2024

(51) Int. Cl.
| | |
|---|---|
| *G01S 13/931* | (2020.01) |
| *B60R 11/04* | (2006.01) |
| *G01S 7/02* | (2006.01) |
| *B60R 11/00* | (2006.01) |

(52) U.S. Cl.
CPC ........... *G01S 13/931* (2013.01); *B60R 11/04* (2013.01); *G01S 7/027* (2021.05); *B60R 2011/004* (2013.01)

(58) Field of Classification Search
CPC ...... G01S 13/931; G01S 7/027; G01S 7/4043; G01S 13/87; G01S 13/865; G01S 13/867; G01S 2013/9323; B60R 11/04; B60R 2011/004
See application file for complete search history.

(56) References Cited

U.S. PATENT DOCUMENTS

| | | | |
|---|---|---|---|
| 2017/0371338 A1* | 12/2017 | Kamata | G05D 1/024 |
| 2018/0180719 A1* | 6/2018 | Bier | G01S 17/08 |
| 2021/0156960 A1* | 5/2021 | Popov | G01S 13/89 |

* cited by examiner

*Primary Examiner* — David Z Huang
(74) *Attorney, Agent, or Firm* — Honigman LLP; Matthew H. Szalach; Jonathan P. O'Brien

(57) ABSTRACT

The disclosed technology provides solutions for repositioning an adjustable sensor with respect to the autonomous vehicle in response to a determination that the field of view of the sensor is obstructed. A method of the disclosed technology can include steps for actuating an adjustable sensor housing comprising receiving a first set of sensor data representing an environment around an autonomous vehicle (AV), wherein the first set of sensor data is collected using a sensor mounted to the AV via an adjustable sensor housing, determining, based on the first set of sensor data, that a field of view (FOV) for the sensor is obstructed, and in response to the determination that the FOV for the sensor is obstructed, actuating the adjustable sensor housing to reposition the sensor with respect to the AV. Systems and machine-readable media are also provided.

20 Claims, 7 Drawing Sheets

190

152

130

140

180

150

120

Local
Computing
Device
110

122

124

126

AV
102

300

COLLECT SENSOR DATA
(302)

OCCLUSION?
(304)

YES

NO

REPOSITION
SENSOR
(306)

400

RECEIVE A FIRST SET OF SENSOR DATA REPRESENTING AN ENVIRONMENT AROUND AN AV
402

DETERMINE, BASED ON THE FIRST SET OF SENSOR DATA, THAT A FIELD OF VIEW (FOV) FOR A SECOND SENSOR IS OBSTRUCTED
404

IN RESPONSE TO THE DETERMINATION THAT THE FOV FOR THE SECOND SENSOR IS OBSTRUCTED, ACTUATE THE ADJUSTABLE SENSOR HOUSING TO REPOSITION THE SECOND SENSOR WITH RESPECT TO THE AV
406

ADJUSTABLE SENSOR HOUSING

BACKGROUND

1. Technical Field

The disclosed technology provides solutions for overcoming occlusions by adjusting the position of sensors mounted on an autonomous vehicle and in particular, provides methods for repositioning an adjustable sensor with respect to the autonomous vehicle (AV) in response to a determination that the field of view of the sensor is at least partially obstructed.

2. Introduction

Autonomous vehicles (AVs) are vehicles having computers and control systems that perform driving and navigation tasks that are conventionally performed by a human driver. As AV technologies continue to advance, they will be increasingly used to improve transportation efficiency and safety. As such, AVs will need to perform many of the functions that are conventionally performed by human drivers, such as performing navigation and routing tasks necessary to provide a safe and efficient transportation. Such tasks may require the collection and processing of large quantities of data using various sensor types, including but not limited to cameras and/or Light Detection and Ranging (LiDAR) sensors disposed on the AV. In some instances, the collected data can be used by the AV to perform tasks relating to routing, planning and obstacle avoidance.

BRIEF DESCRIPTION OF THE DRAWINGS

Certain features of the subject technology are set forth in the appended claims. However, the accompanying drawings, which are included to provide further understanding, illustrate disclosed aspects and together with the description explain the principles of the subject technology. In the drawings:

DETAILED DESCRIPTION

Figure 1:
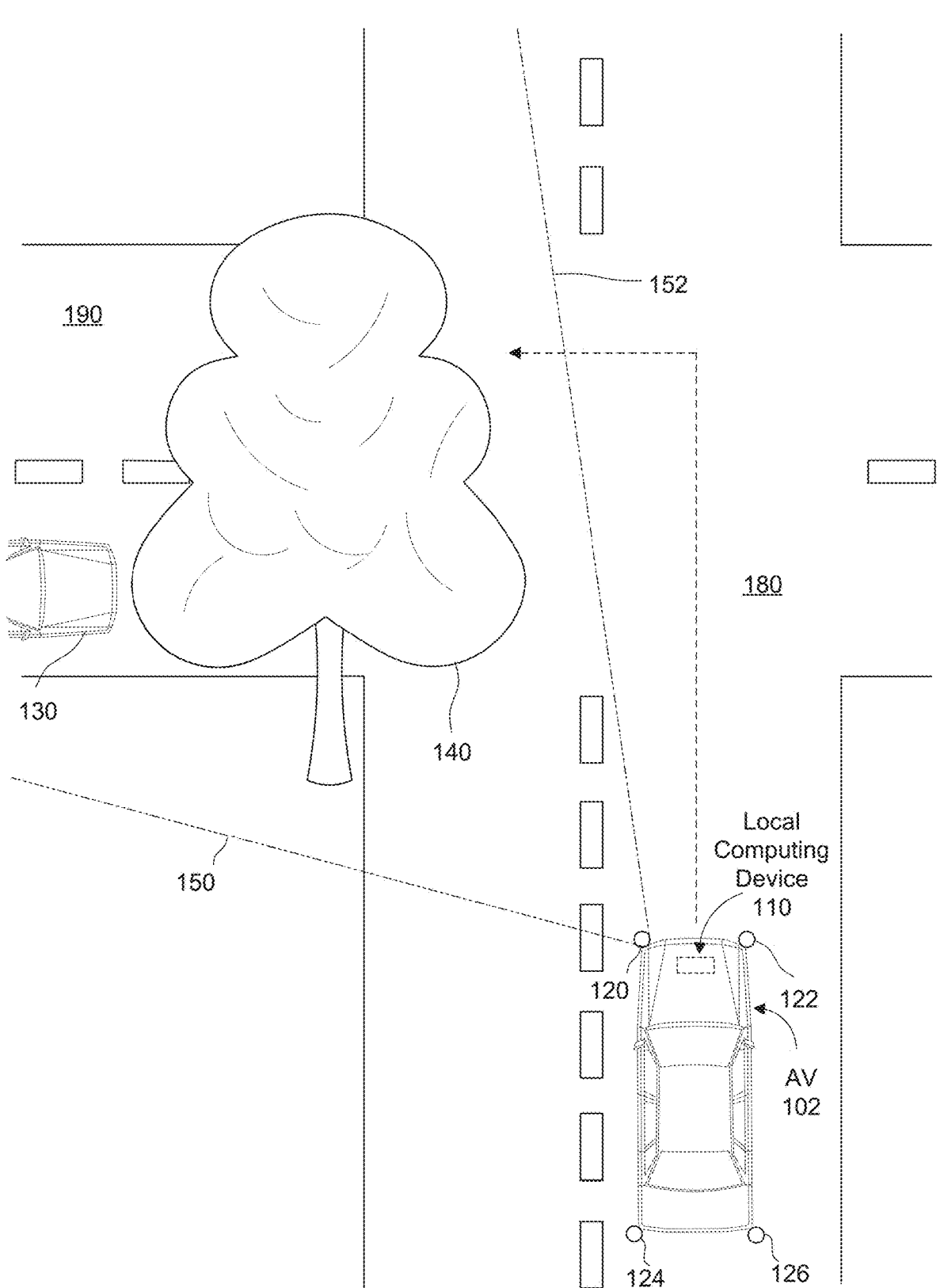
FIG. 1 is a perspective view of an example autonomous vehicle (AV) with mounted sensors showing the field of view (FOV) of the sensors as the AV moves along a roadway, according to some aspects of the disclosed technology.

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form to avoid obscuring certain concepts.

As described herein, one aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs) use sensor signals generated by sensors mounted at various positions about the AV to navigate roadways without a human driver. In some examples, the sensors can be optical sensors (e.g., LIDAR systems, ambient light sensors, infrared sensors, etc.), cameras (e.g., still image cameras, video cameras, etc.), RADAR systems, GPS receivers, audio sensors (e.g., microphones, Sound Navigation and Ranging (SONAR) systems, ultrasonic sensors, etc.), Inertial Measurement Units (IMUs), engine sensors, speedometers, tachometers, odometers, altimeters, tilt sensors, impact sensors, airbag sensors, seat occupancy sensors, open/closed door sensors, tire pressure sensors, rain sensors, and so forth. Any other number and type of sensors that can aid the AV in navigating can also be employed. One important consideration when designing an AV is where to physically place the sensors on the AV to optimize the field of view (FOV) of the sensors. A larger the field of view of the sensors provides the AV controller with more useful sensor data that can be used to guide the AV, thereby providing a safer and more efficient experience.

The optimal location and position of each sensor mounted on the AV can change during operation due to various real-world factors. While sensors are placed at optimal positions prior to dispatch, unexpected occlusions can appear during the AV's journey that block the FOV of a sensor. Therefore, the AV can benefit from the ability to dynamically reposition the various sensors as needed. For example, an AV travelling on a roadway may encounter an unexpected occlusion (such as an overgrown tree or a large, double-parked truck, for example) that can obstruct a sensor from viewing objects located behind the occlusion. In such a scenario, the AV can benefit from the ability to reposition the sensor to a different position in order to better view the obstructed area or object. In another example, a sensor positioned in the AV may be unintentionally moved out of position in response to being hit by an external force (for example, a person or another vehicle bumping the AV), and the AV would benefit from the ability to dynamically reposition the sensor back to its intended position. In another example, a sensor may become damaged requiring the AV to reposition other operational sensors in a manner that aids in providing optimal FOV coverage that is lost due to the damaged sensor.

FIG. 1 is an illustrative example of a perspective view of an AV with mounted sensors showing the field of view (FOV) of the sensors as the AV moves along an example roadway. In this example, AV 102 comprises sensors 120, 122, 124, and 126 mounted at positions around the exterior of AV 102, as well as local computing device 110. Sensors 120, 122, 124, and 126 can provide data to local computing device 110, which uses the data to guide the AV 102 along the roadway. Each sensor mounted on the AV comprises a FOV. For example, in FIG. 1, sensor 120 comprises a FOV that is indicated as the area located between lines 150 and 152. Sensors 122, 124, and 126 also comprise respective FOVs, which are not illustrated in FIG. 1.

In the example illustrated in FIG. 1, AV 102 is travelling along roadway 180 and plans to turn left onto roadway 190, as indicated by the dotted arrow. As AV 102 travels, sensors 120, 122, 124, and 126 provide local computing device with data obtained from the FOV of each sensor. In some examples, sensors 120, 122, 124, and 126 monitor the environment via their respective FOV to inform the local computing device 110 of approaching objects, such as cars, bicycles, or pedestrians, that the AV needs to avoid. For example, if AV 102 wishes to turn left from roadway 180 onto roadway 190 and the sensors 120 or 122 observe a vehicle approaching from the opposite direction on roadway 180, the local computing device 110 will instruct AV 102 to wait until the approaching vehicle has passed by AV 102 before instructing AV 102 to turn onto roadway 190. In this manner, AV 102 will avoid a collision with the approaching vehicle by not turning before the approaching vehicle has passed by AV 102.

However, in some scenarios the sensor's FOV can be partially or completely obstructed by an occlusion that blocks the sensor's FOV. In this scenario, the sensor may be unable to determine if another object (such as, for example, a car, bicycle, or pedestrian) is located in the path that AV 102 intends to travel, hidden behind the occlusion. For example, as illustrated in FIG. 1, occlusion 140 is partially obstructing the FOV 150 of sensor 120 so that sensor 120 cannot detect vehicle 130 travelling on roadway 190. This scenario could lead to a potentially dangerous collision between AV 102 and vehicle 130. Therefore, in order to improve sensor 120's FOV, the local computing device 110 can be configured to reposition sensor 120 in a manner that removes the obstruction, e.g., by moving sensor 120 to a higher location on the AV that can see over the top of occlusion 140.

The local computing device 110 can be capable of determining whether a sensor's FOV is obstructed by an occlusion and subsequently instruct the obstructed sensor to mechanically reposition itself about the AV 102 in order to improve the sensor's FOV. The exact physical location of each sensor about the AV 102 is a necessary parameter that the local computing device 110 uses when determining how to guide the AV 102. Therefore, the sensors have a limited number of specific positions where they may be positioned so that the local computing device 110 can make the necessary calculations to guide the AV 102 appropriately. Once the local computing device 110 instructs a sensor to reposition itself to an alternate position, the local computing device 110 will keep track of the new position in order to be sure that the calculations are correct. In some examples, there are three or four predetermined alternate positions for each sensor that the local computing device 110 can instruct the sensors to move to. However, there is no limit to the number of alternate positions that may be employed. In some examples, the sensors comprise Inertial Measurement Units (IMUs) that can provide data to the local computing device 110 to confirm that the sensors are in the exact correct position. That is, after the local computing device 110 instructs a sensor to reposition itself to an alternate position, the sensor's IMU will send a signal to the local computing device 110 that indicates the new location of the sensor. The local computing device 110 can then determine if the sensor is in the correct position and therefore continue to rely on the sensor, or determine if the sensor is not in the correct position and therefore not rely on the sensor.

In addition to occlusions that may obstruct the sensor's FOV, there are additional scenarios where the local computing device 110 may wish to reposition a sensor. For example, if a sensor's IMU indicates that a sensor is not in one of the predetermined positions, the local computing device 110 can reposition that sensor to one of the predetermined positions. Such a scenario may occur if a person or object bumps into a sensor, for example, or any other situation where the position of the sensor is altered unintentionally. In another example, if a sensor is damaged or not working properly, local computing device 110 may deactivate the damaged sensor and further instruct other sensors to move to alternative predetermined positions to compensate for the deactivated damaged sensor.

Figure 2:
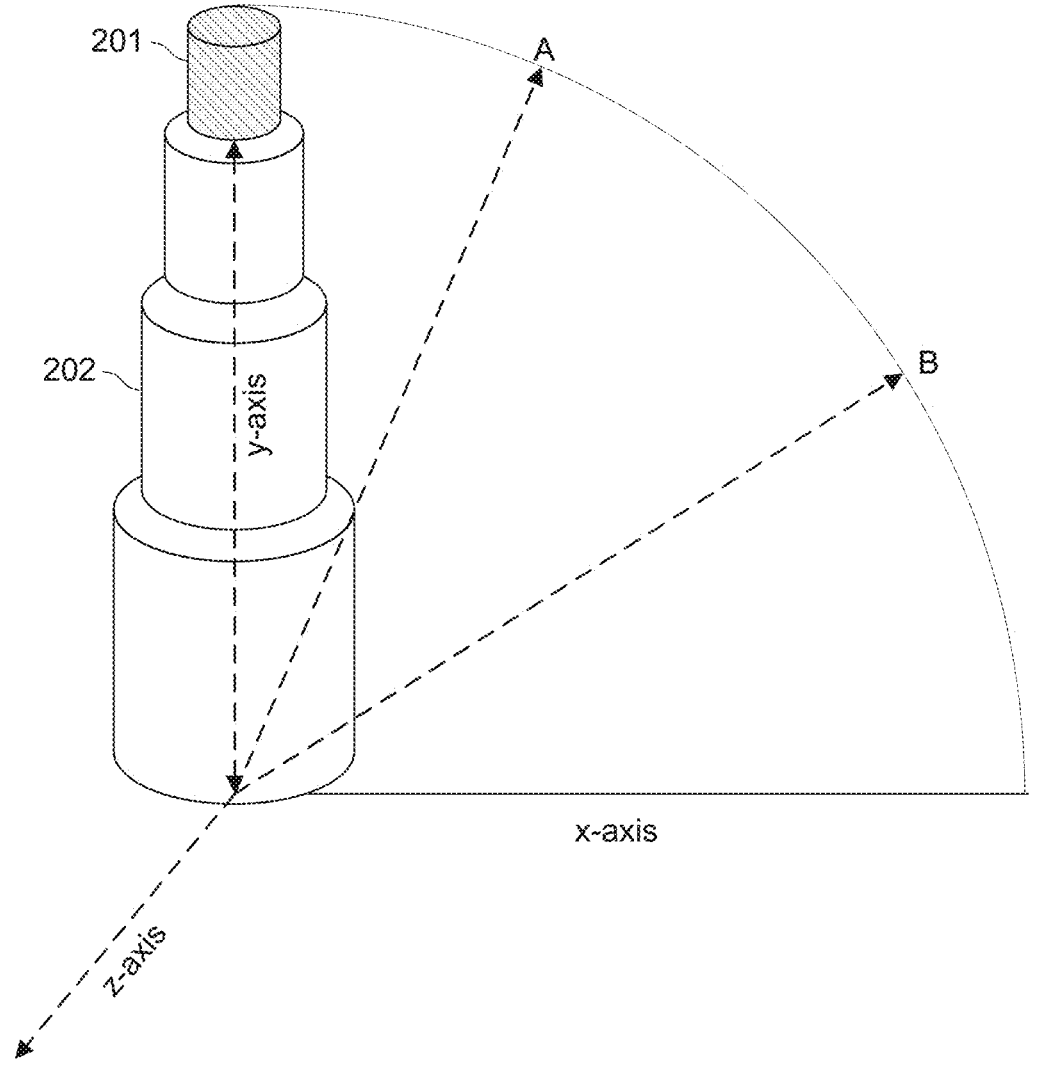
FIG. 2 is a side-view of an example extendable/adjustable sensor housing, according to some aspects of the disclosed technology.

FIG. 2 is an illustrative example of a side view of the sensor housing 202. In some examples, sensor 201 can be mounted on a telescoping sensor housing 202 as illustrated in FIG. 2. In some examples, multiple sensors can be mounted on telescoping sensor housing 202. As discussed above, these sensors can include optical sensors (e.g., LIDAR systems, ambient light sensors, infrared sensors, etc.), cameras (e.g., still image cameras, video cameras, etc.), RADAR systems, GPS receivers, audio sensors (e.g., microphones, Sound Navigation and Ranging (SONAR) systems, ultrasonic sensors, etc.), Inertial Measurement Units (IMUs), engine sensors, speedometers, tachometers, odometers, altimeters, tilt sensors, impact sensors, airbag sensors, seat occupancy sensors, open/closed door sensors, tire pressure sensors, rain sensors, and so forth. Any other number and type of sensors that can aid the AV in navigating can also be mounted on telescoping sensor housing 202. In some examples, multiple different types of sensors can be mounted on the same telescoping sensor housing 202. Telescoping is one example of a structure that permits the sensor to be extended in both y-directions, but any suitable method for adjusting the sensor in the y-directions can be used. In some examples, the sensor housing 202 can extend in the y-direction, as indicated by the arrow, when instructed to be repositioned by the local computing device 110 as described previously. In some examples, the sensor housing 202 can further reposition the sensor 201 in the x-direction. For example, the local computing device 110 can instruct the sensor housing 202 to position the sensor 201 at predetermined positions "A" and "B" shown in FIG. 2. Positions "A" and "B" are merely example positions and any predetermined position is possible. In some examples, the local computing device 110 can instruct the sensor housing 202 to position the sensor 201 to a predetermined position in the z-direction in the same manner. In this way, the sensor 201 can be positioned in any position along the x, y, or z (i.e., pitch, roll, yaw) direction that has been predetermined by the local computing device 110. In some examples, the sensor 201 can be locked into any of the predetermined positions along each of x, y, and z directions. In some examples, a mechanical mechanism can be employed to fix the orientation of the sensor housing 202 to prevent unwanted articulation of the sensor away from a selected position. In some examples a brake can be employed lock the sensor 201 into any of the predetermined positions along each of x, y, and z directions.

Figure 3:
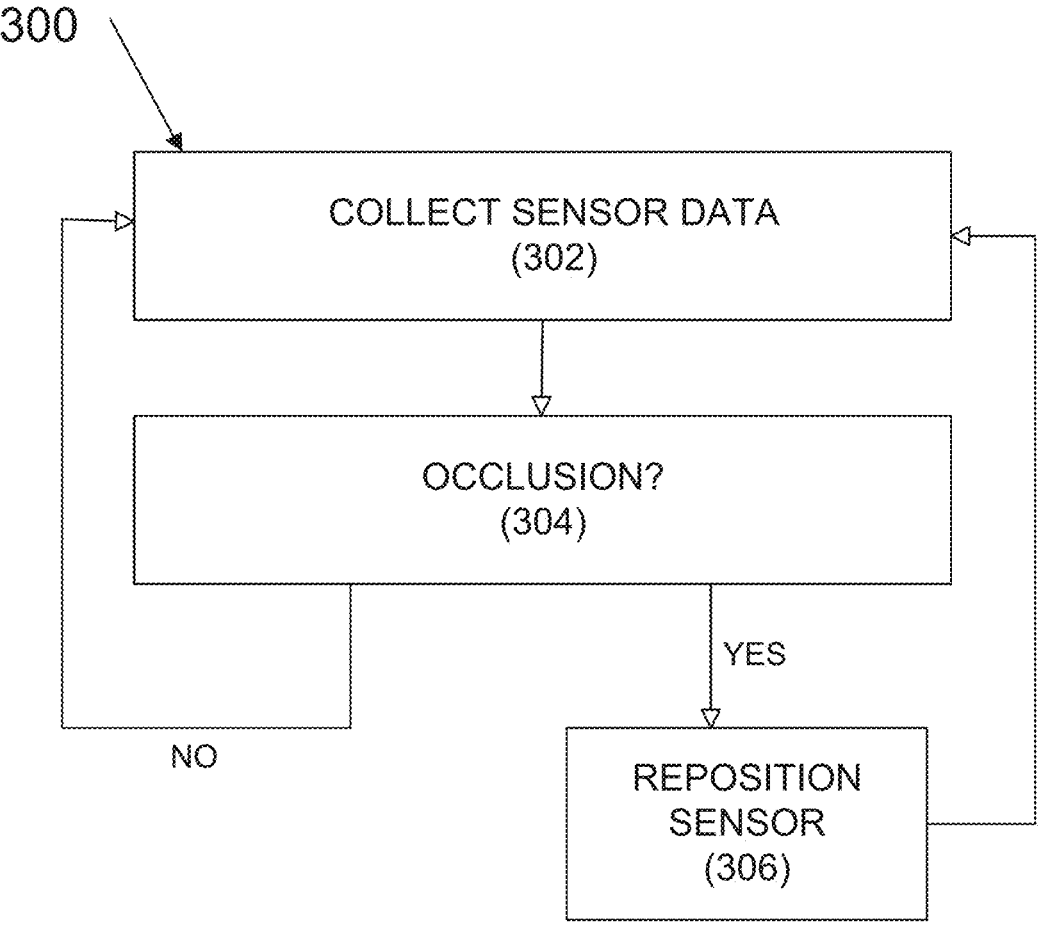
FIG. 3 illustrates a flow diagram of an example method for modifying sensor position or pose in response to a detected occlusion, according to some aspects of the disclosed technology.

FIG. 3 illustrates a flow diagram of an example method for the disclosed invention, according to some aspects of the disclosed technology. At block 302, the process 300 can include the AV (e.g., AV 102) using mounted sensors (e.g., sensors 120, 122, 124, and 126) to collect sensor data. As discussed in more detail below, AV 102 can navigate roadways without a human driver based on sensor signals generated by multiple sensor systems. In some examples, the sensor systems can include different types of sensors and can be arranged about the AV 102. For instance, the sensor systems can comprise Inertial Measurement Units (IMUs), cameras (e.g., still image cameras, video cameras, etc.), optical sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. Other embodiments may include any other number and type of sensors. As discussed above, any other number and type of sensors that can aid the AV in navigating can also be mounted on telescoping sensor housing 202.

As discussed in more detail below, a perception stack 612 (illustrated in FIG. 6) can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems. The perception stack 612 can detect and classify objects and determine their current locations, speeds, directions, and the like. In addition, the perception stack 612 can determine the free space around the AV 102 (e.g., to maintain a safe distance from other objects, change lanes, park the AV, etc.). The perception stack 612 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

At block 304, the process 300 can include using the perception stack 612 to determine whether there is an occlusion blocking the field of view (FOV) of a sensor mounted on the AV. In some examples, the prediction stack determines whether the bounding area around the perceived object is fully visible to the sensor, or if the bounding area is at least partially obscured. In the scenario where the bounding area around a perceived object is fully visible, the perception stack determines that no occlusion exists. Conversely, in the scenario where the bounding area around a perceived object is at least partially obscured, the perception stack determines that an occlusion does exist. In other examples, if the perception stack is tracking an object located at a distance based on the received sensor data and the perception stack is suddenly presented with sensor data from an object at a much closer distance than the object that the perception stack is tracking, the perception stack can determine that an occlusion exists. In still other examples, if the perception stack is tracking a moving object and the perception stack is suddenly presented with sensor data from an object at a much closer distance than the moving object that the perception stack is tracking, the perception stack can determine that an occlusion exists. In some examples, sensor data received from sensors mounted on the AV can be used by the perception stack to detect when a different sensor mounted on the AV is being occluded.

As further illustrated in FIG. 3, in the scenario where the perception stack determines that no occlusion exists, the sensors continue to collect sensor data (i.e., returns to step 302). In some examples, each sensor can have a preferred location where the sensor is mounted as it continues to collect sensor data. In the scenario where the perception stack determines that an occlusion is blocking the field of view (FOV) of a mounted sensor, the local computing device 110 sends instructions to reposition the affected sensor to a different position. In some examples, the local computing device 110 can use the location of the occlusion determined by the perception stack to determine which predetermined sensor position is most likely to provide the affected sensor with the largest FOV. After the local computing device 110 sends instructions to reposition the affected sensor to the new position, an actuator moves the sensor to that specified position. In some examples, after the sensor has moved, the sensor's IMU can send a signal to the local computing device 110 to confirm that the sensor is located at the correct position. Next, the sensor collects data (i.e., step 302), and subsequently provides the data to the perception stack so that the perception stack and determine whether there is still an occlusion blocking the FOV of the sensor. In the same manner as discussed above, if an occlusion is determined, the sensor is moved to a new position and the process continues. Conversely, if there is no occlusion blocking the FOV of the sensor, the sensor continues to collect data. In the scenario where the sensor is moved to a new position, the sensor can move back to the original preferred position discussed above after a predetermined period of time. In some examples, if the sensor has been repositioned from the preferred location to a secondary location in response to an occlusion, the perception stack can determine whether to move the sensor back to the preferred location by tracking the occlusion using the same or different sensors to determine if the occlusion has moved enough to return the sensor to the preferred location. In this scenario, the sensor can be slowly transitioned in real-time as the occlusion is slowly moving (whether actually moving or moving in relation to the AV). In some examples, Alternatively, the senor can be repositioned to the preferred position at periodic time intervals to determined whether the sensor is still occluded at the preferred position.

Figure 4:
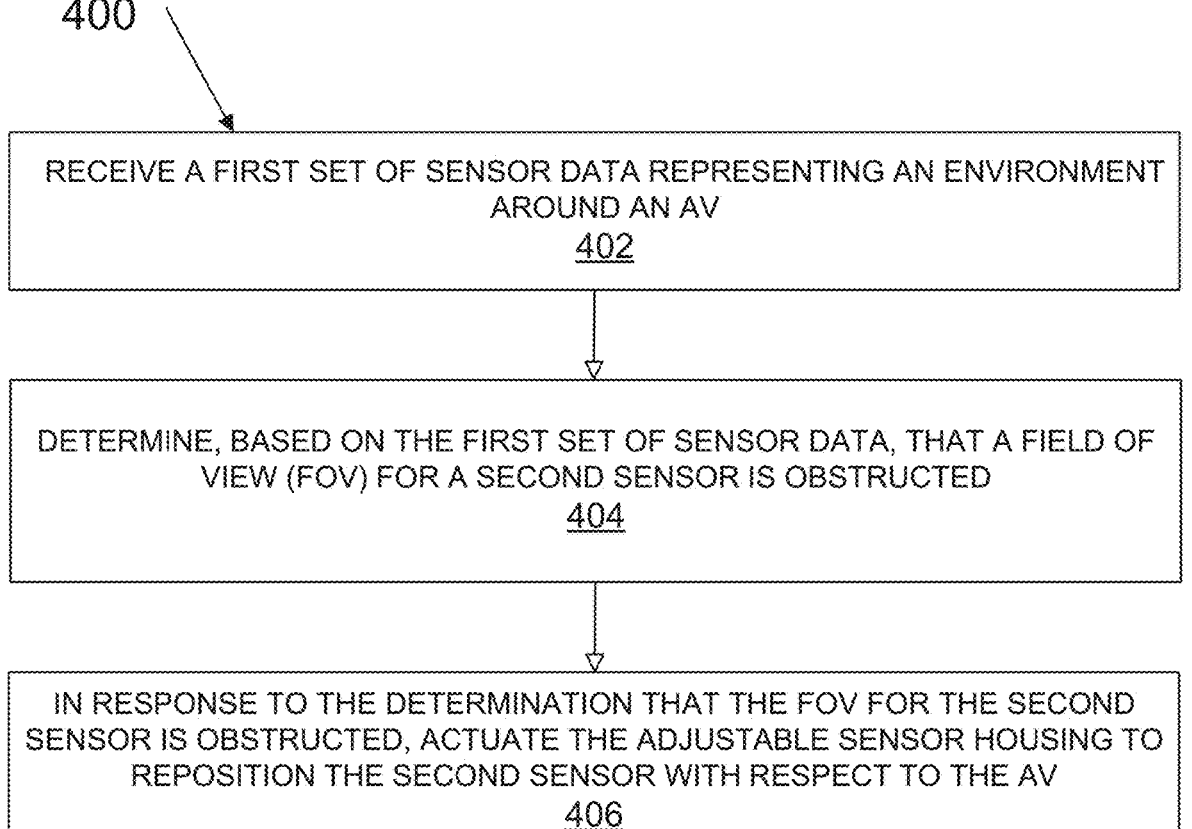
FIG. 4 illustrates a flow diagram of an example method for repositioning an adjustable sensor in response to a determination that the FOV of the sensor is obstructed, according to some aspects of the disclosed technology.

FIG. 4 illustrates a flow diagram of an example method for repositioning an adjustable sensor mounted on an autonomous vehicle (AV) in response to a determination that the field of view of the sensor is obstructed. At block 402, the process 400 can include receiving a first set of sensor data representing an environment around an autonomous vehicle (e.g., AV 102), wherein the first set of sensor data is collected using a sensor mounted to the AV (e.g., sensor 120) via an adjustable sensor housing.

At block 404, the process 400 can include determining, based on the first set of sensor data, that a field of view (FOV) (e.g., area located between dotted lines 150 and 152 of FIG. 1) for a second sensor is obstructed. In some examples, the FOV of the second sensor can be obstructed by an object (e.g., tree 140). In some examples, the FOV of the sensor can be obstructed due to damage to the sensor. These examples, however, are not limiting. In some examples, the prediction stack can combine the sensor data with map data to predict when an occlusion will occur. Some occlusions can be permanent (i.e. a building) and other occlusions can be temporary (i.e. double-parked truck). Sensor data can be combined with map data to determine whether an occlusion is permanent or temporary. In some examples, detected permanent occlusions can be added to map data and used by the AVs to predict occlusions. In some examples, the occlusion map data can indicate the location of the occlusion, which sensors will be occluded, the time of the predicted occlusion, areas on a map that are affected, and the location that the sensor should reposition to during each part of the occlusion.

At block 406, the process 400 can include actuating the adjustable sensor housing to reposition the sensor with respect to the AV in response to the determination that the FOV for the sensor is obstructed. In some examples, the sensor's IMU will generate a signal to inform the local computing device of the sensor's position so that the local computing device can confirm that the sensor has reached the correct position.

Figure 5:
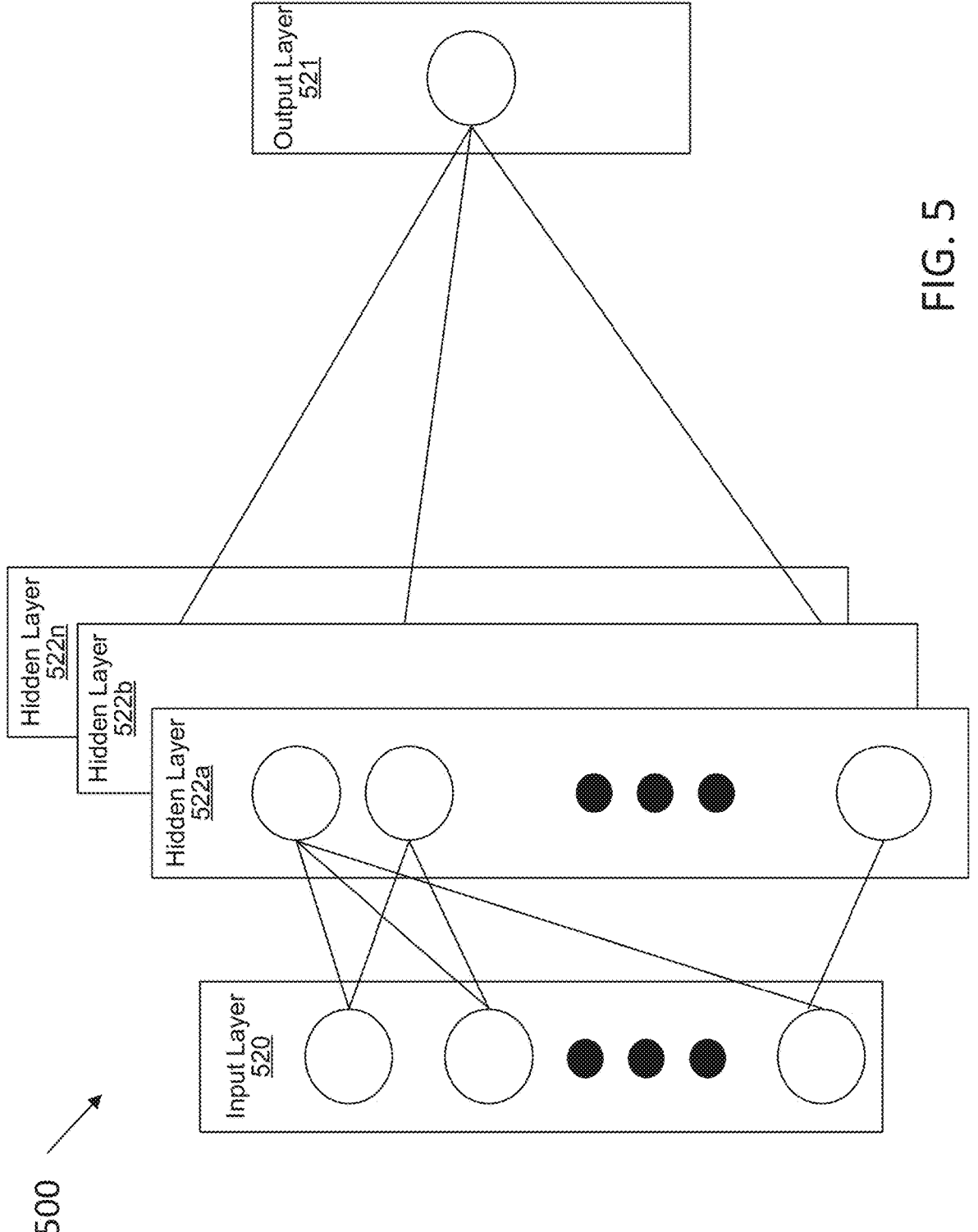
FIG. 5 is an illustrative example of a deep learning neural network that can be used to identify occlusions or obstructions in an AV sensor's FOV, according to some aspects of the disclosed technology.

FIG. 5 is an illustrative example of a deep learning neural network 500 that can be implemented to detect occlusions to a field-of-view of one or more AV sensors. An input layer 520 includes input data. The deep learning neural network 500 may be implemented in either the perception stack or the prediction stack of the AV stack as discussed with regard to FIG. 6. In some examples, the inputs to the perception stack include the various sensor data collected from the various sensor mounted on the AV. In some examples, the inputs to the prediction stack can include the detected object position, size, and related semantic data. In one illustrative example, the input layer 520 can be configured to receive sensor data associated with a given AV sensor, such as a camera or LiDAR sensor. The neural network 500 includes multiple hidden layers 522a, 522b, through 522n. The hidden layers 522a, 522b, through 522n include "n" number of hidden layers, where "n" is an integer greater than or equal to one. The number of hidden layers can be made to include as many layers as needed for the given application. The neural network 500 further includes an output layer 521 that provides an output resulting from the processing performed by the hidden layers 522a, 522b, through 522n.

The neural network 500 is a multi-layer neural network of interconnected nodes. Each node can represent a piece of information. Information associated with the nodes is shared among the different layers and each layer retains information as information is processed. In some cases, the neural network 500 can include a feed-forward network, in which case there are no feedback connections where outputs of the network are fed back into itself. In some cases, the neural network 500 can include a recurrent neural network, which can have loops that allow information to be carried across nodes while reading in input.

Information can be exchanged between nodes through node-to-node interconnections between the various layers. Nodes of the input layer 520 can activate a set of nodes in the first hidden layer 522a. For example, as shown, each of the input nodes of the input layer 520 is connected to each of the nodes of the first hidden layer 522a. The nodes of the first hidden layer 522a can transform the information of each input node by applying activation functions to the input node information. The information derived from the transformation can then be passed to and can activate the nodes of the next hidden layer 522b, which can perform their own designated functions. Example functions include convolutional, up-sampling, data transformation, and/or any other suitable functions. The output of the hidden layer 522b can then activate nodes of the next hidden layer, and so on. The output of the last hidden layer 522n can activate one or more nodes of the output layer 521, at which an output is provided. Further to the above examples, if deep learning neural network 500 is implemented as part of the AV's perception layer, the output layer 521 may include object size, position, location, semantic labeling. Further, if deep learning neural network 500 is implemented as part of the AV's prediction layer, the output layer 521 may include data related to predicting the future locations and speeds of the detected objects.

In some cases, while nodes (e.g., node 526) in the neural network 500 are shown as having multiple output lines, a node can have a single output and all lines shown as being output from a node represent the same output value.

In some cases, each node or interconnection between nodes can have a weight that is a set of parameters derived from the training of the neural network 500. Once the neural network 500 is trained, it can be referred to as a trained neural network, which can be used to classify one or more activities. For example, an interconnection between nodes can represent a piece of information learned about the interconnected nodes. The interconnection can have a tunable numeric weight that can be tuned (e.g., based on a training dataset), allowing the neural network 500 to be adaptive to inputs and able to learn as more and more data is processed.

The neural network 500 is pre-trained to process the features from the data in the input layer 520 using the different hidden layers 522a, 522b, through 522n in order to provide the output through the output layer 521. In some cases, the neural network 500 can adjust the weights of the nodes using a training process called backpropagation. As noted above, a backpropagation process can include a forward pass, a loss function, a backward pass, and a weight update. The forward pass, loss function, backward pass, and parameter update is performed for one training iteration. The process can be repeated for a certain number of iterations for each set of training data until the neural network 500 is trained well enough so that the weights of the layers are accurately tuned.

A loss function can be used to analyze error in the output. Any suitable loss function definition can be used, such as a Cross-Entropy loss. Another example of a loss function includes the mean squared error (MSE), defined as $E\_total=\Sigma(\frac{1}{2}(target-output)^2)$. The loss can be set to be equal to the value of E_total. The goal of training is to minimize the amount of loss so that the predicted output is the same as the training label. The neural network 500 can perform a backward pass by determining which inputs (weights) most contributed to the loss of the network, and can adjust the weights so that the loss decreases and is eventually minimized. A derivative of the loss with respect to the weights (denoted as dL/dW, where W are the weights at a particular layer) can be computed to determine the weights that contributed most to the loss of the network. After the derivative is computed, a weight update can be performed by updating all the weights of the filters. For example, the weights can be updated so that they change in the opposite direction of the gradient. The weight update can be denoted as $w=w\_i-\eta \, dL/dW$, where w denotes a weight, wi denotes the initial weight, and $\eta$ denotes a learning rate. The learning rate can be set to any suitable value, with a high learning rate including larger weight updates and a lower value indicating smaller weight updates.

The neural network 500 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The neural network 500 can include any other deep network other than a CNN, such as an autoencoder, a deep belief nets (DBNs), a Recurrent Neural Networks (RNNs), among others.

As understood by those of skill in the art, machine-learning based classification techniques can vary depending on the desired implementation. For example, machine-learning classification schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Mini-wise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of: a Mini-batch Dictionary Learning algorithm, an Incremental Principal Component Analysis (PCA) algorithm, a Latent Dirichlet Allocation algorithm, and/or a Mini-batch K-means algorithm, etc.

Figure 6:
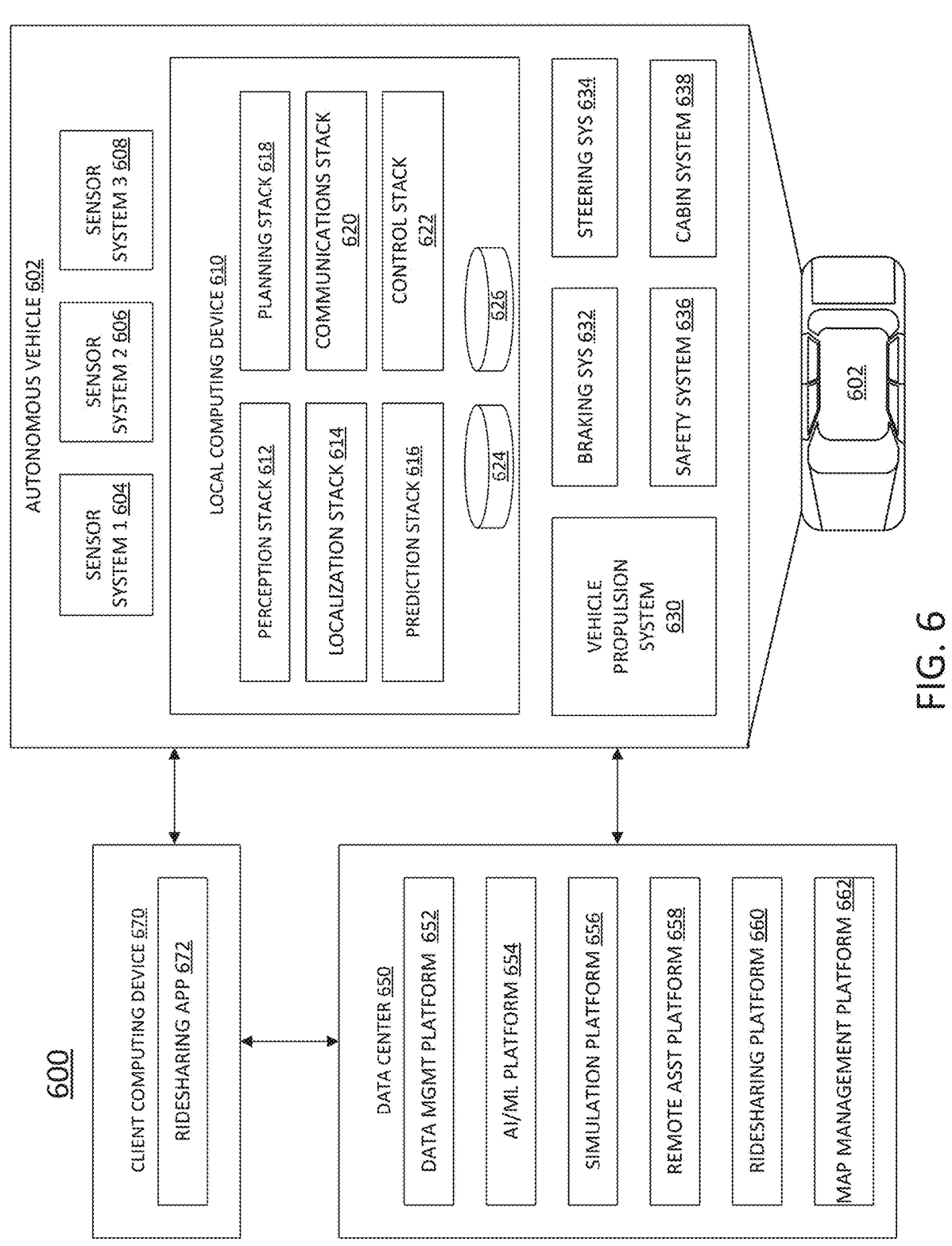
FIG. 6 illustrates an example of an AV management system, according to some aspects of the disclosed technology.

FIG. 6 illustrates an example of an AV management system 600. One of ordinary skill in the art will understand that, for the AV management system 600 and any system discussed in the present disclosure, there can be additional or fewer components in similar or alternative configurations. The illustrations and examples provided in the present disclosure are for conciseness and clarity. Other embodiments may include different numbers and/or types of elements, but one of ordinary skill the art will appreciate that such variations do not depart from the scope of the present disclosure.

In this example, the AV management system 600 includes an AV 602, a data center 150, and a client computing device 170. The AV 602, the data center 650, and the client computing device 670 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

AV 602 can navigate roadways without a human driver based on sensor signals generated by multiple sensor systems 604, 606, and 608. The sensor systems 604-608 can include different types of sensors and can be arranged about the AV 602. For instance, the sensor systems 604-608 can comprise Inertial Measurement Units (IMUs), cameras (e.g., still image cameras, video cameras, etc.), optical sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 604 can be a camera system, the sensor system 606 can be a LIDAR system, and the sensor system 608 can be a RADAR system. Other embodiments may include any other number and type of sensors.

The AV 602 can also include several mechanical systems that can be used to maneuver or operate the AV 602. For instance, the mechanical systems can include a vehicle propulsion system 630, a braking system 632, a steering system 634, a safety system 636, and a cabin system 638, among other systems. The vehicle propulsion system 630 can include an electric motor, an internal combustion engine, or both. The braking system 632 can include an engine brake, brake pads, actuators, and/or any other suitable componentry configured to assist in decelerating the AV 602. The steering system 634 can include suitable componentry configured to control the direction of movement of the AV 602 during navigation. The safety system 636 can include lights and signal indicators, a parking brake, airbags, and so forth. The cabin system 638 can include cabin temperature control systems, in-cabin entertainment systems, and so forth. In some embodiments, the AV 602 might not include human driver actuators (e.g., steering wheel, handbrake, foot brake pedal, foot accelerator pedal, turn signal lever, window wipers, etc.) for controlling the AV 602. Instead, the cabin system 638 can include one or more client interfaces (e.g., Graphical User Interfaces (GUIs), Voice User Interfaces (VUIs), etc.) for controlling certain aspects of the mechanical systems 630-638.

The AV 602 can additionally include a local computing device 610 that is in communication with the sensor systems 604-608, the mechanical systems 630-638, the data center 650, and the client computing device 670, among other systems. The local computing device 610 can include one or more processors and memory, including instructions that can be executed by the one or more processors. The instructions can make up one or more software stacks or components responsible for controlling the AV 602; communicating with the data center 650, the client computing device 670, and other systems; receiving inputs from riders, passengers, and other entities within the AV's environment; logging metrics collected by the sensor systems 604-608; and so forth. In this example, the local computing device 610 includes a perception stack 612, a mapping and localization stack 614, a prediction stack 616, a planning stack 618, a communications stack 620, a control stack 622, an AV operational database 624, and an HD geospatial database 626, among other stacks and systems.

The perception stack 612 can enable the AV 602 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 604-608, the mapping and localization stack 614, the HD geospatial database 626, other components of the AV, and other data sources (e.g., the data center 650, the client computing device 670, third party data sources, etc.). The perception stack 612 can detect and classify objects and determine their current locations, speeds, directions, and the like. In addition, the perception stack 612 can determine the free space around the AV 602 (e.g., to maintain a safe distance from other objects, change lanes, park the AV, etc.). The perception stack 612 can also identify environmental uncertainties, such as where to look for moving objects, flag areas that may be obscured or blocked from view, and so forth. In some embodiments, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

Mapping and localization stack 614 can determine the AV's position and orientation (pose) using different methods from multiple systems (e.g., GPS, IMUs, cameras, LIDAR, RADAR, ultrasonic sensors, the HD geospatial database 626, etc.). For example, in some embodiments, AV 602 can compare sensor data captured in real-time by sensor systems 604-608 to data in HD geospatial database 626 to determine its precise (e.g., accurate to the order of a few centimeters or less) position and orientation. AV 602 can focus its search based on sensor data from one or more first sensor systems (e.g., GPS) by matching sensor data from one or more second sensor systems (e.g., LIDAR). If the mapping and localization information from one system is unavailable, AV 602 can use mapping and localization information from a redundant system and/or from remote data sources.

Prediction stack 616 can receive information from localization stack 614 and objects identified by perception stack 612 and predict a future path for the objects. In some embodiments, prediction stack 616 can output several likely paths that an object is predicted to take along with a probability associated with each path. For each predicted path, prediction stack 616 can also output a range of points along the path corresponding to a predicted location of the object along the path at future time intervals along with an expected error value for each of the points that indicates a probabilistic deviation from that point.

Planning stack 618 can determine how to maneuver or operate AV 602 safely and efficiently in its environment. For example, planning stack 618 can receive the location, speed, and direction of AV 602, geospatial data, data regarding objects sharing the road with AV 602 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 602 from one point to another and outputs from the perception stack 612, localization stack 614, and prediction stack 616. Planning stack 618 can determine multiple sets of one or more mechanical operations that AV 602 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right; decelerate until completely stopped and reverse; etc.), and select the best one to meet changing road conditions and events. If something unexpected happens, the planning stack 618 can select from multiple backup plans to carry out. For example, while preparing to change lanes to turn right at an intersection, another vehicle may aggressively cut into the destination lane, making the lane change unsafe. The planning stack 618 could have already determined an alternative plan for such an event. Upon its occurrence, it could help direct AV 602 to go around the block instead of blocking a current lane while waiting for an opening to change lanes.

Control stack 622 can manage the operation of the vehicle propulsion system 630, the braking system 632, the steering system 634, the safety system 636, and the cabin system

638. Control stack 622 can receive sensor signals from the sensor systems 604-608 as well as communicate with other stacks or components of the local computing device 610 or a remote system (e.g., the data center 650) to effectuate operation of AV 602. For example, control stack 622 can implement the final path or actions from the multiple paths or actions provided by planning stack 618. This can involve turning the routes and decisions from planning stack 618 into commands for the actuators that control the AV's steering, throttle, brake, and drive unit.

Communications stack 620 can transmit and receive signals between the various stacks and other components of AV 602 and between AV 602, data center 650, client computing device 670, and other remote systems. Communications stack 620 can enable the local computing device 610 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). Communications stack 620 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

HD geospatial database 626 can store HD maps and related data of the streets upon which the AV 602 travels. In some embodiments, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include 3D attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

AV operational database 624 can store raw AV data generated by the sensor systems 604-608, stacks 612-622, and other components of AV 602 and/or data received by AV 602 from remote systems (e.g., data center 650, client computing device 670, etc.). In some embodiments, the raw AV data can include HD LIDAR point cloud data, image data, RADAR data, GPS data, and other sensor data that data center 650 can use for creating or updating AV geospatial data or for creating simulations of situations encountered by AV 602 for future testing or training of various machine learning algorithms that are incorporated in local computing device 610.

Data center 650 can be a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and so forth. Data center 650 can include one or more computing devices remote to local computing device 610 for managing a fleet of AVs and AV-related services. For example, in addition to managing AV 602, data center 650 may also support a ridesharing service, a delivery service, a remote/roadside assistance service, street services (e.g., street mapping, street patrol, street cleaning, street metering, parking reservation, etc.), and the like.

Data center 650 can send and receive various signals to and from AV 602 and client computing device 670. These signals can include sensor data captured by the sensor systems 604-608, roadside assistance requests, software updates, ridesharing pick-up and drop-off instructions, and so forth. In this example, data center 650 includes a data management platform 652, an Artificial Intelligence/Machine Learning (AI/ML) platform 654, a simulation platform 656, a remote assistance platform 658, and a ridesharing platform 660, and a map management platform 662, among other systems.

Data management platform 652 can be a "big data" system capable of receiving and transmitting data at high velocities (e.g., near real-time or real-time), processing a large variety of data and storing large volumes of data (e.g., terabytes, petabytes, or more of data). The varieties of data can include data having different structured (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), or data having other heterogeneous characteristics. The various platforms and systems of the data center 650 can access data stored by the data management platform 652 to provide their respective services.

AI/ML platform 654 can provide the infrastructure for training and evaluating machine learning algorithms for operating AV 602, the simulation platform 656, the remote assistance platform 658, the ridesharing platform 660, the map management platform 662, and other platforms and systems. Using the AI/ML platform 654, data scientists can prepare data sets from the data management platform 652; select, design, and train machine learning models; evaluate, refine, and deploy the models; maintain, monitor, and retrain the models; and so on.

Simulation platform 656 can enable testing and validation of the algorithms, machine learning models, neural networks, and other development efforts for AV 602, remote assistance platform 658, ridesharing platform 660, map management platform 662, and other platforms and systems. The simulation platform 656 can replicate a variety of driving environments and/or reproduce real-world scenarios from data captured by AV 602, including rendering geospatial information and road infrastructure (e.g., streets, lanes, crosswalks, traffic lights, stop signs, etc.) obtained from a cartography platform (e.g., map management platform 662); modeling the behavior of other vehicles, bicycles, pedestrians, and other dynamic elements; simulating inclement weather conditions, different traffic scenarios; and so on.

Remote assistance platform 658 can generate and transmit instructions regarding the operation of the AV 602. For example, in response to an output of the AI/ML platform 654 or other system of data center 650, remote assistance platform 658 can prepare instructions for one or more stacks or other components of AV 602.

Ridesharing platform 660 can interact with a customer of a ridesharing service via a ridesharing application 672 executing on client computing device 670. The client computing device 670 can be any type of computing system, including a server, desktop computer, laptop, tablet, smartphone, smart wearable device (e.g., smartwatch, smart eyeglasses or other Head-Mounted Display (HMD), smart ear pods, or other smart in-ear, on-ear, or over-ear device, etc.), gaming system, or other general purpose computing device for accessing ridesharing application 672. Client computing device 670 can be a customer's mobile computing device or a computing device integrated with the AV 602 (e.g., the local computing device 610). The ridesharing platform 660 can receive requests to pick up or drop off from the ridesharing application 672 and dispatch the AV 602 for the trip.

Map management platform 662 can provide a set of tools for the manipulation and management of geographic and spatial (geospatial) and related attribute data. The data management platform 652 can receive LIDAR point cloud data, image data (e.g., still image, video, etc.), RADAR data, GPS data, and other sensor data (e.g., raw data) from one or more AVs 602, Unmanned Aerial Vehicles (UAVs), satellites, third-party mapping services, and other sources of geospatially referenced data. The raw data can be processed, and map management platform 662 can render base representations (e.g., tiles (2D), bounding volumes (3D), etc.) of the AV geospatial data to enable users to view, query, label, edit, and otherwise interact with the data. Map management platform 662 can manage workflows and tasks for operating on the AV geospatial data. Map management platform 662 can control access to the AV geospatial data, including granting or limiting access to the AV geospatial data based on user-based, role-based, group-based, task-based, and other attribute-based access control mechanisms. Map management platform 662 can provide version control for the AV geospatial data, such as to track specific changes that (human or machine) map editors have made to the data and to revert changes when necessary. Map management platform 662 can administer release management of the AV geospatial data, including distributing suitable iterations of the data to different users, computing devices, AVs, and other consumers of HD maps. Map management platform 662 can provide analytics regarding the AV geospatial data and related data, such as to generate insights relating to the throughput and quality of mapping tasks.

In some embodiments, the map viewing services of map management platform 662 can be modularized and deployed as part of one or more of the platforms and systems of data center 650. For example, the AI/ML platform 654 may incorporate the map viewing services for visualizing the effectiveness of various object detection or object classification models, simulation platform 656 may incorporate the map viewing services for recreating and visualizing certain driving scenarios, remote assistance platform 658 may incorporate the map viewing services for replaying traffic incidents to facilitate and coordinate aid, ridesharing platform 660 may incorporate the map viewing services into client application 672 to enable passengers to view AV 602 in transit en route to a pick-up or drop-off location, and so on.

Figure 7:
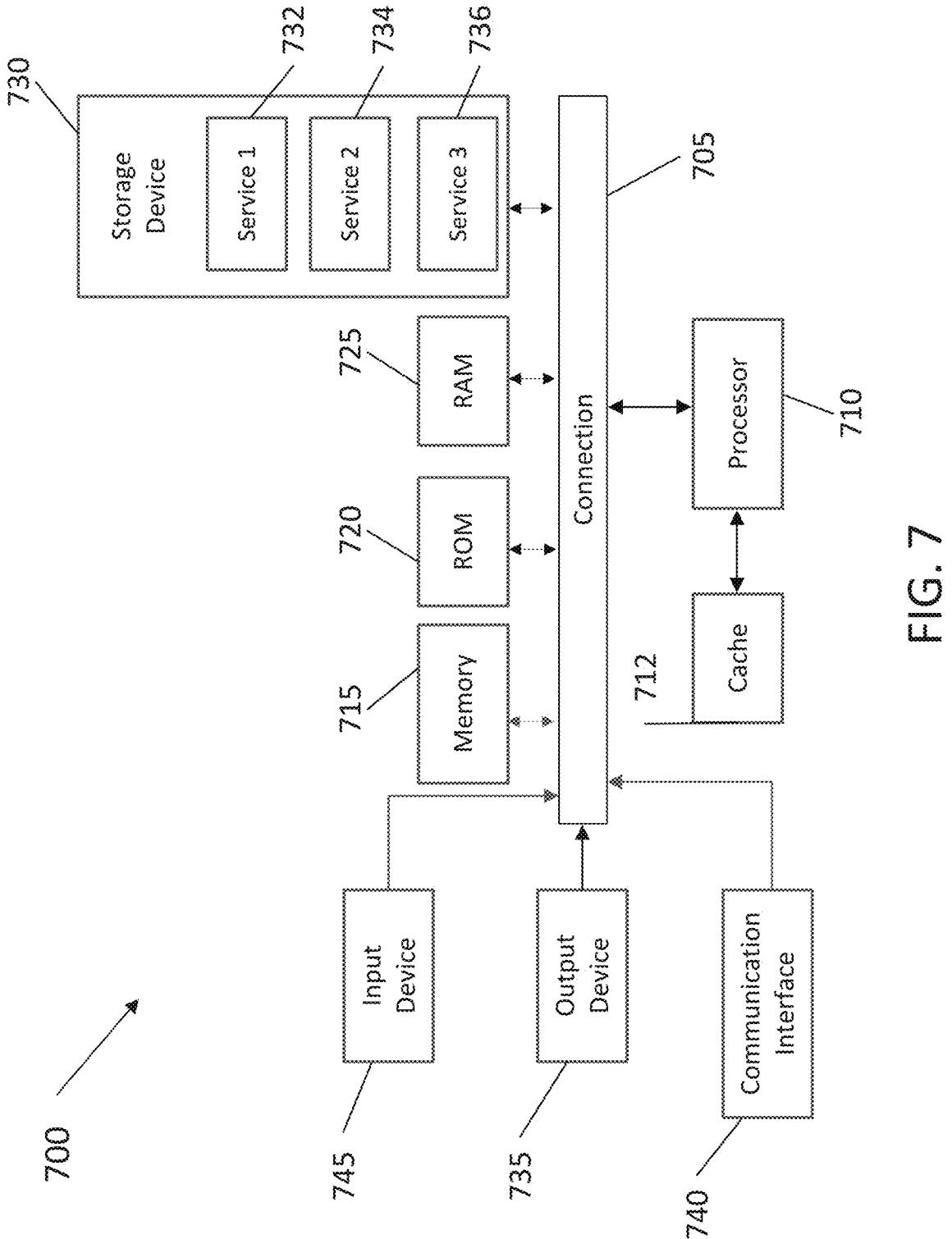
FIG. 7 illustrates an example processor-based system with which some aspects of the subject technology can be implemented.

FIG. 7 illustrates an example apparatus (e.g., a processor-based system) with which some aspects of the subject technology can be implemented. For example, processor-based system 700 can be any computing device making up internal computing system 610, remote computing system 650, a passenger device executing the rideshare app 670, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

Computing system 700 can be (or may include) a distributed system in which the functions described in this disclosure can be distributed within a datacenter, multiple data centers, a peer network, etc. In some embodiments, one or more of the described system components represents many such components each performing some or all of the functions for which the component is described. In some embodiments, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 includes an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning® port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/5G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communication interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLO-NASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory and/or computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a Blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L5/L6), resistive random-access memory (RRAM/Re-RAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, it causes the system to perform a function. In some embodiments, a hardware service that performs a particular function can include the software component stored in a computer-readable medium in connection with the necessary hardware components, such as processor 710, connection 705, output device 735, etc., to carry out the function.

Embodiments within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special purpose computer, or special purpose processing device to perform a certain function or group of functions. Computer-executable instructions also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other embodiments of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Embodiments may also be practiced in distributed computing environments where tasks are performed by local and remote processing devices that are linked (either by hardwired links, wireless links, or by a combination thereof) through a communications network. In a distributed computing environment, program modules may be located in both local and remote memory storage devices.

The various embodiments described above are provided by way of illustration only and should not be construed to limit the scope of the disclosure. For example, the principles herein apply equally to optimization as well as general improvements. Various modifications and changes may be made to the principles described herein without following the example embodiments and applications illustrated and described herein, and without departing from the spirit and scope of the disclosure. Claim language reciting "at least one of" a set indicates that one member of the set or multiple members of the set satisfy the claim.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B, or C" means A, B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

Illustrative examples of the disclosure include:

Aspect 1. An apparatus comprising: at least one memory; and at least one processor coupled to the at least one memory, the at least one processor configured to: receive a first set of sensor data representing an environment around an autonomous vehicle (AV), wherein the first set of sensor data is collected using a sensor mounted to the AV via an adjustable sensor housing; determine, based on the first set of sensor data, that a field of view (FOV) for a second sensor is obstructed; and in response to the determination that the FOV for the second sensor is obstructed, actuate the adjustable sensor housing to reposition the second sensor with respect to the AV.

Aspect 2. The apparatus of Aspect 1, wherein to determine that the FOV for the second sensor is obstructed, the at least one processor is further configured to: provide the first set of sensor data to a perception layer of a software stack for the AV; identify a semantic label for at least one object in the FOV for the second sensor; and determine that the at least one object is occluded within the FOV based on the semantic label.

Aspect 3. The apparatus of Aspect 1 or 2, wherein the at least one processor is further configured to: receive a second set of sensor data; and determine, based on the second set of sensor data, if the FOV for the second sensor is obstructed.

Aspect 4. The apparatus of any of Aspects 1 to 3, wherein to actuate the adjustable sensor housing to reposition the second sensor with respect to the AV, the at least one processor is further configured to: actuate one or more motors disposed in the adjustable sensor housing to modify a pitch of the second sensor.

Aspect 5. The apparatus of any of Aspects 1 to 4, wherein to actuate the adjustable sensor housing to reposition the second sensor with respect to the AV, the at least one processor is further configured to: actuate one or more motors disposed in the adjustable sensor housing to modify a roll of the second sensor.

Aspect 6. The apparatus of any of Aspects 1 to 5, wherein to actuate the adjustable sensor housing to reposition the second sensor with respect to the AV, the at least one processor is further configured to: actuate one or more motors disposed in the adjustable sensor housing to modify a yaw of the second sensor.

Aspect 7. The apparatus of any of Aspects 1 to 6, wherein the second sensor is a Light Detection and Ranging (LiDAR) sensor, a cameral sensor, or a Radio Detection and Ranging (RADAR) sensor.

Aspect 8. A computer-implemented method for actuating an adjustable sensor housing comprising: receiving a first set of sensor data representing an environment around an autonomous vehicle (AV), wherein the first set of sensor data is collected using a sensor mounted to the AV via an adjustable sensor housing; determining, based on the first set of sensor data, that a field of view (FOV) for the a second sensor is obstructed; and in response to the determination that the FOV for the second sensor is obstructed, actuating the adjustable sensor housing to reposition the second sensor with respect to the AV.

Aspect 9. The computer-implemented method of Aspect 8, wherein determining that the FOV for the second sensor is obstructed, further comprises: providing the first set of sensor data to a perception layer of a software stack for the AV; identifying a semantic label for at least one object in the FOV for the second sensor; and determining that the at least one object is occluded within the FOV based on the semantic label.

Aspect 10. The computer-implemented method of Aspect 8 or 9, further comprising: receiving a second set of sensor data; and determining, based on the second set of sensor data, if the FOV for the second sensor is obstructed.

Aspect 11. The computer-implemented method of any of Aspects 8 to 10, wherein actuating the adjustable sensor housing to reposition the second sensor with respect to the AV, further comprises: actuating one or more motors disposed in the adjustable sensor housing to modify a pitch of the second sensor.

Aspect 12. The computer-implemented method of any of Aspects 8 to 11, wherein actuating the adjustable sensor housing to reposition the second sensor with respect to the AV, further comprises: actuating one or more motors disposed in the adjustable sensor housing to modify a roll of the second sensor.

Aspect 13. The computer-implemented method of any of Aspects 8 to 12, wherein actuating the adjustable sensor housing to reposition the second sensor with respect to the AV, further comprises: actuating one or more motors disposed in the adjustable sensor housing to modify a yaw of the second sensor.

Aspect 14. The computer-implemented method of any of Aspects 8 to 13, wherein the second sensor is a Light Detection and Ranging (LiDAR) sensor, a cameral sensor, or a Radio Detection and Ranging (RADAR) sensor.

Aspect 15. A non-transitory computer-readable storage medium comprising at least one instruction for causing a computer or processor to: receive a first set of sensor data representing an environment around an autonomous vehicle (AV), wherein the first set of sensor data is collected using a sensor mounted to the AV via an adjustable sensor housing; determine, based on the first set of sensor data, that a field of view (FOV) for the a second sensor is obstructed; and in response to the determination that the FOV for the second sensor is obstructed, actuate the adjustable sensor housing to reposition the second sensor with respect to the AV.

Aspect 16. The non-transitory computer-readable storage medium of Aspect 15, wherein to determine that the FOV for the second sensor is obstructed, the at least one processor is further configured to: provide the first set of sensor data to a perception layer of a software stack for the AV; identify a semantic label for at least one object in the FOV for the second sensor; and determine that the at least one object is occluded within the FOV based on the semantic label.

Aspect 17. The non-transitory computer-readable storage medium of Aspect 15 or 15, wherein the at least one processor is further configured to: receive a second set of sensor data; and determine, based on the second set of sensor data, if the FOV for the second sensor is obstructed.

Aspect 18. The non-transitory computer-readable storage medium of any of Aspects 15 to 17, wherein to actuate the adjustable sensor housing to reposition the second sensor with respect to the AV, the at least one processor is further configured to: actuate one or more motors disposed in the adjustable sensor housing to modify a pitch of the second sensor.

Aspect 19. The non-transitory computer-readable storage medium of any of Aspects 15 to 18, wherein to actuate the adjustable sensor housing to reposition the second sensor with respect to the AV, the at least one processor is further configured to: actuate one or more motors disposed in the adjustable sensor housing to modify a roll of the second sensor.

Aspect 20. The non-transitory computer-readable storage medium of any of Aspects 15 to 19, wherein to actuate the adjustable sensor housing to reposition the second sensor with respect to the AV, the at least one processor is further configured to: actuate one or more motors disposed in the adjustable sensor housing to modify a yaw of the second sensor.

What is claimed is:

1. An apparatus comprising:
at least one memory; and
at least one processor coupled to the at least one memory, the at least one processor configured to:
receive a first set of sensor data representing an environment around an autonomous vehicle (AV), wherein the first set of sensor data is collected using a sensor mounted to the AV via an adjustable sensor housing;
determine, based on the first set of sensor data and map data, that a field of view (FOV) for a second sensor is obstructed;
determine, based on the first set of sensor data and the map data, that the obstruction is permanent;
based on the determination that the obstruction is permanent, update the map data to include data indicating a location of the permanent obstruction and a predetermined repositioning location for the second sensor associated with the permanent obstruction; and
based on the determination that the FOV for the second sensor is obstructed, actuate the adjustable sensor housing to reposition the second sensor with respect to the AV to the predetermined repositioning location indicated in the updated map data.

2. The apparatus of claim 1, wherein to determine that the FOV for the second sensor is obstructed, the at least one processor is further configured to provide the first set of sensor data to a perception layer of a software stack for the AV;
identify a semantic label for at least one object in the FOV for the second sensor; and
determine that the at least one object is occluded within the FOV based on the semantic label.

3. The apparatus of claim 1, wherein the at least one processor is further configured to:
receive a second set of sensor data; and
determine, based on the second set of sensor data, if the FOV for the second sensor is obstructed.

4. The apparatus of claim 1, wherein to actuate the adjustable sensor housing to reposition the second sensor with respect to the AV, the at least one processor is further configured to:
actuate one or more motors disposed in the adjustable sensor housing to modify a pitch of the second sensor.

5. The apparatus of claim 1, wherein to actuate the adjustable sensor housing to reposition the second sensor with respect to the AV, the at least one processor is further configured to:
actuate one or more motors disposed in the adjustable sensor housing to modify a roll of the second sensor.

6. The apparatus of claim 1, wherein to actuate the adjustable sensor housing to reposition the second sensor with respect to the AV, the at least one processor is further configured to:

actuate one or more motors disposed in the adjustable sensor housing to modify a yaw of the second sensor.

7. The apparatus of claim 1, wherein the second sensor is a Light Detection and Ranging (LiDAR) sensor, a camera sensor, or a Radio Detection and Ranging (RADAR) sensor.

8. A computer-implemented method for actuating an adjustable sensor housing comprising:

receiving a first set of sensor data representing an environment around an autonomous vehicle (AV), wherein the first set of sensor data is collected using a sensor mounted to the AV via the adjustable sensor housing;

determining, based on the first set of sensor data and map data, that a field of view (FOV) for a second sensor is obstructed;

determining, based on the first set of sensor data and the map data, that the obstruction is permanent;

based on the determination that the obstruction is permanent, updating the map data to include data indicating a location of the permanent obstruction and a predetermined repositioning location for the second sensor associated with the permanent obstruction; and based on the determination that the FOV for the second sensor is obstructed, actuating the adjustable sensor housing to reposition the second sensor with respect to the AV to the predetermined repositioning location indicated in the updated map data.

9. The computer-implemented method of claim 8, wherein determining that the FOV for the second sensor is obstructed, further comprises:

providing the first set of sensor data to a perception layer of a software stack for the AV;

identifying a semantic label for at least one object in the FOV for the second sensor; and determining that the at least one object is occluded within the FOV based on the semantic label.

10. The computer-implemented method of claim 8, further comprising:

receiving a second set of sensor data; and determining, based on the second set of sensor data, if the FOV for the second sensor is obstructed.

11. The computer-implemented method of claim 8, wherein actuating the adjustable sensor housing to reposition the second sensor with respect to the AV, further comprises:

actuating one or more motors disposed in the adjustable sensor housing to modify a pitch of the second sensor.

12. The computer-implemented method of claim 8, wherein actuating the adjustable sensor housing to reposition the second sensor with respect to the AV, further comprises:

actuating one or more motors disposed in the adjustable sensor housing to modify a roll of the second sensor.

13. The computer-implemented method of claim 8, wherein actuating the adjustable sensor housing to reposition the second sensor with respect to the AV, further comprises:

actuating one or more motors disposed in the adjustable sensor housing to modify a yaw of the second sensor.

14. The computer-implemented method of claim 8, wherein the second sensor is a Light Detection and Ranging (LiDAR) sensor, a camera sensor, or a Radio Detection and Ranging (RADAR) sensor.

15. A non-transitory computer-readable storage medium comprising at least one instruction for causing a computer or processor to:

receive a first set of sensor data representing an environment around an autonomous vehicle (AV), wherein the first set of sensor data is collected using a sensor mounted to the AV via an adjustable sensor housing;

determine, based on the first set of sensor data and map data, that a field of view (FOV) for a second sensor is obstructed;

determine, based on the first set of sensor data and the map data, that the obstruction is permanent;

based on the determination that the obstruction is permanent, update the map data to include data indicating a location of the permanent obstruction and a predetermined repositioning location for the second sensor associated with the permanent obstruction; and based on the determination that the FOV for the second sensor is obstructed, actuate the adjustable sensor housing to reposition the second sensor with respect to the AV to the predetermined repositioning location indicated in the updated map data.

16. The non-transitory computer-readable storage medium of claim 15, wherein to determine that the FOV for the second sensor is obstructed, the at least one instruction causes the computer or processor to:

provide the first set of sensor data to a perception layer of a software stack for the AV;

identify a semantic label for at least one object in the FOV for the second sensor; and determine that the at least one object is occluded within the FOV based on the semantic label.

17. The non-transitory computer-readable storage medium of claim 15, wherein the at least one instruction causes the computer or processor to:

receive a second set of sensor data; and determine, based on the second set of sensor data, if the FOV for the second sensor is obstructed.

18. The non-transitory computer-readable storage medium of claim 15, wherein to actuate the adjustable sensor housing to reposition the second sensor with respect to the AV, the at least one instruction causes the computer or processor to:

actuate one or more motors disposed in the adjustable sensor housing to modify a pitch of the second sensor.

19. The non-transitory computer-readable storage medium of claim 15, wherein to actuate the adjustable sensor housing to reposition the second sensor with respect to the AV, the at least one instruction causes the computer or processor to:

actuate one or more motors disposed in the adjustable sensor housing to modify a roll of the second sensor.

20. The non-transitory computer-readable storage medium of claim 15, wherein to actuate the adjustable sensor housing to reposition the second sensor with respect to the AV, the at least one instruction causes the computer or processor to:

actuate one or more motors disposed in the adjustable sensor housing to modify a yaw of the second sensor.

* * * * *